May 24, 1960 J. R. ANDERSON 2,938,194
FERROELECTRIC STORAGE CIRCUITS
Filed July 25, 1955
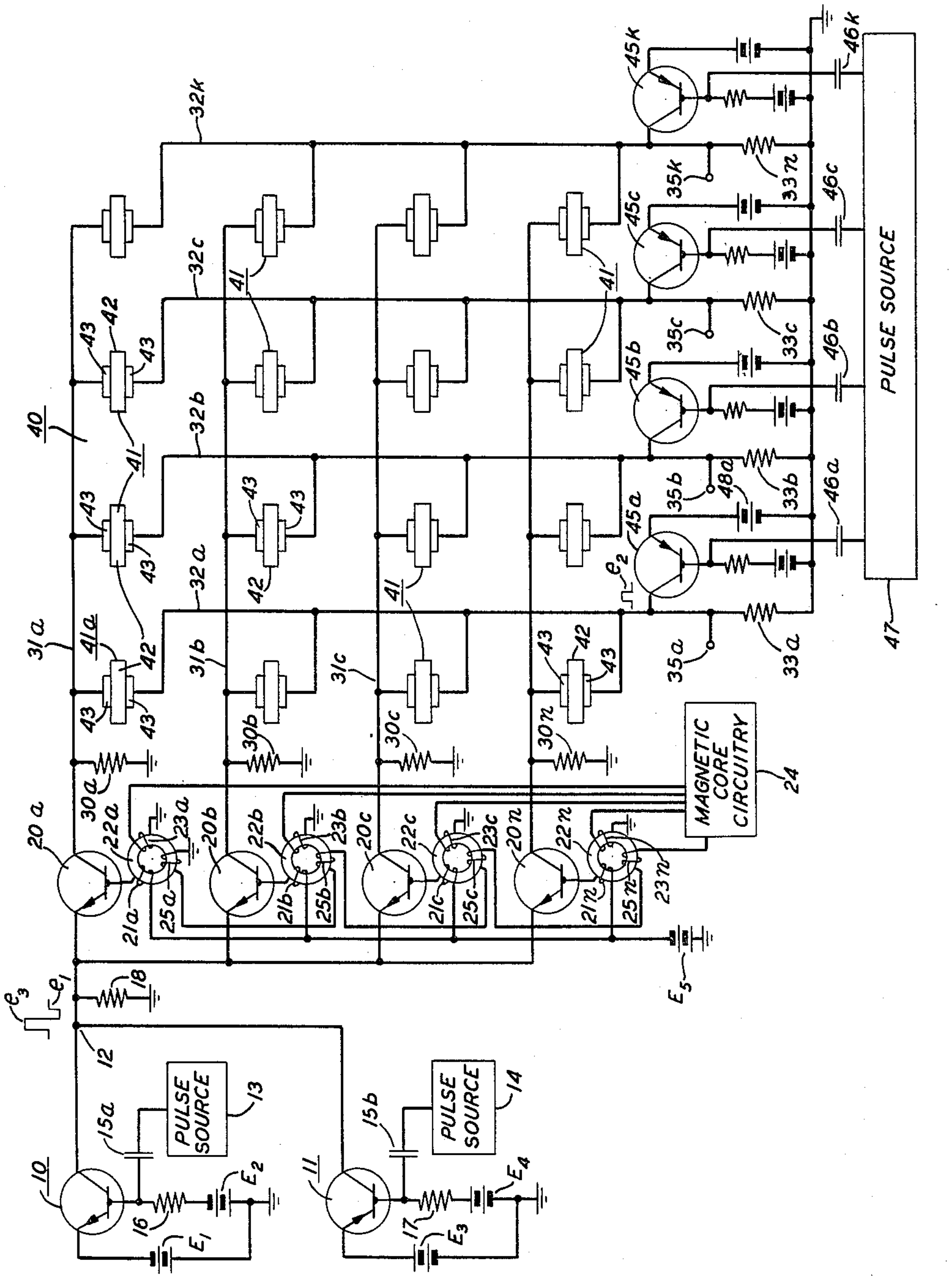
INVENTOR
J. R. ANDERSON
BY
ATTORNEY United States Patent Office 2,938,194
Patented May 24, 1960

2,938,194

FERROELECTRIC STORAGE CIRCUITS

John R. Anderson, Berkeley Heights, N.J., assignor to Bell Telephone Laboratories, Incorporated, New York, N.Y., a corporation of New York Filed July 25, 1955, Ser. No. 524,081

8 Claims. (Cl. 340—173)

This invention relates to electrical circuits for the storage of information and, more particularly, to such circuits utilizing ferroelectric elements.

A number of ferroelectric condensers may be arranged in a rectangular array with row and column leads therefor and comprising a storage matrix. Such a matrix may be established on a single crystal of ferroelectric material by placing electrodes in parallel rows on one surface of the crystal and by placing similar parallel electrodes on the opposite surface forming a substantial right angle with the electrodes on the first surface. Information may be stored or read out from one or a number of these ferroelectric condensers at a time. As disclosed in my application Serial No. 261,665, filed December 14, 1951, now Patent 2,717,373, issued September 6, 1955, a particular condenser is chosen for the storage of information by having a voltage of one polarity applied to the electrode on one side of that condenser and a voltage of opposite polarity applied to the electrode on the other side of the condenser. These two voltages are individually insufficient to reverse the polarization of the ferroelectric material between these particular electrodes but when occurring together are of proper polarity and sufficient voltage to cause reversal of the polarization of the material of the condenser and thus storage of information. A third voltage may then be applied across the condenser of sufficient voltage and proper polarity to cause a return to the initial state of polarization of the ferroelectric material thereby sensing or reading out any information stored in the condenser. After the information has been read out, the information may be restored in the condenser by a re-application of the storing pulses to each of the electrodes of that condenser.

One of the difficulties encountered in designing access circuits to the ferroelectric matrices is that pulses of opposite polarity are required to be applied through a selection switch to a selected point. Another difficulty is that the current passing through the selection switch may vary by large amounts depending on the number of storage cells connected to that point that are to be switched.

It is an object of this invention to provide improved ferroelectric storage circuits.

Another object of this invention is to provide an improved electronic switch for a ferroelectric storage matrix comprising principally solid state devices.

Another object of this invention is to provide an electronic switch capable of controlling at microsecond speeds the application of store and read-out pulses to a ferroelectric matrix.

A further object of this invention is to provide an electronic gate or switch capable of controlling the application of constant voltages of either polarity to a ferroelectric matrix.

A still further object of this invention is to provide an electronic gate or switch for a ferroelectric matrix exhibiting a substantially constant input impedance for changing values of load impedance.

A still further object of this invention is to provide an electronic gate for controlling the application of constant voltages of either polarity to a ferroelectric matrix, which gates are capable of being rapidly changed from a high impedance to a very low impedance.

In one specific illustrative embodiment of this invention, a two-dimensional storage matrix comprises a plurality of ferroelectric condensers arranged in a rectangular array. Storage or read-in and sensing or read-out of information relative to this matrix are accomplished by the application of pulses of predetermined magnitude and polarity to selected row and column leads of the matrix. A particular condenser is selected for the storage of information by applying a voltage of one polarity to one of the row leads of the matrix and applying a voltage of the opposite polarity to a column lead. The two voltages are individually insufficient to reverse the polarization of the ferroelectric condenser but when occurring together are sufficient to reverse the polarization of the ferroelectric condenser. A third voltage may be applied across this condenser of sufficient voltage and proper polarity to cause a return to the initial state of polarization of the ferroelectric material, thus, reading out the information stored in the condenser.

In accordance with a feature of this invention, transistor switches are employed in generating the storage or read-in pulses as well as the sensing or read-out pulses which are to be applied to the ferroelectric matrix. For the purpose of generating positive pulses, a p-n-p transistor is employed having a positive constant voltage applied to its emitter and its base biased to cut off. For the purpose of generating negative pulses, an n-p-n transistor is employed having a negative constant voltage applied to its emitter electrode and a cut-off bias applied to its base. These transistor switches are capable of being actuated by the application of pulses to the transistor bases, which pulses overcome the cut-off bias. Transistor gates are serially connected between these transistor pulse generators and each of the row leads to selectively control the application of pulses from the generators to the row leads. This selective control is achieved at microsecond speeds by applying a gating pulse to the selected gate, which pulse overcomes the cut-off bias applied to that transistor gate, thus, changing its impedance to the pulses from the pulse generators from a very high value to a very low value irrespective of the polarity of these pulses.

A similar transistor switch is connected to each of the column leads to apply a store pulse to the selected column concurrently with the application of a store pulse to the selected row.

In the normal operating cycle of the ferroelectric matrix, information is first read from a storage condenser and then immediately stored back therein, either the priorly read information or a new information bit being placed back into the condenser. The transistor gates between the transistor multivibrator circuits and the row leads should therefore be maintained in their open or conducting state during the application of both the sensing and the storage pulses from the transistor switches to the row leads. In one specific embodiment of this invention, this is attained by applying an inhibiting bias to the base of each transistor gate through the output winding of a magnetic core, which core may be included in a magnetic core shift register circuit, if periodic access is desired, or a magnetic core selection matrix, if random access is desired. When it is desired to gate the sensing and storing pulses through a particular transistor gate to a row of the ferroelectric storage matrix, a shift or activating pulse is applied to an activating winding on the magnetic core associated with that particular transistor gate. The switching time of the magnetic core is chosen so as to be substantially equal to the duration of both the sensing and the storing pulses applied through the transistor gate to the row lead of the ferroelectric matrix. In this manner the desired transistor gate is rendered conducting by a single pulse applied to the magnetic core whose output winding is in series with the base of that gate, the output pulse appearing on the output winding on switching of the magnetic core overcoming the inhibiting bias normally applied to the transistor base.

It is a feature of this invention to utilize solid state pulse sources and solid state gates to generate pulses and control their application to a ferroelectric matrix.

It is another feature of this invention that transistor switches be employed for generating constant voltages of either polarity to apply storage and sensing pulses to a ferroelectric material.

It is another feature of this invention that transistor gates be employed between the pulse sources and the ferroelectric matrix for changing the value of series impedance presented to the pulses from the switches from a high value to a very low value irrespective of the polarity of the pulses in response to the application of gating pulses to these transistor gates.

It is a further feature of this invention that magnetic cores be employed to apply gating pulses to the bases of the transistor gates to overcome a cut-off bias applied to these bases and thus selectively render the gates conductive to the pulses from the transistor multivibrators.

A complete understanding of this invention and of these and various other features thereof may be gained from consideration of the following detailed description and the accompanying drawing, the single figure of which is a schematic representation of one specific illustrative embodiment of this invention.

Turning now to the drawing, one specific illustrative embodiment is there depicted in schematic form. Transistors 10 and 11, which are of the n-p-n type and p-n-p type respectively, are employed as constant voltage switching circuits selectively to apply positive and negative pulses, respectively, to a terminal 12 upon the application of positive and negative keying pulses, respectively, from sources 13 and 14. These pulses are applied to the bases of the transistors through coupling condensers **15*a* and 15*b*, respectively. A source of negative potential $E_2$ is connected to the base of n-p-n type transistor 10 through a resistor 16. A source of negative forward bias potential $-E_1$ is connected to the emitter electrode of transistor 10. A source of positive potential $E_4$ is connected to the base of p-n-p type transistor 11 through resistor 17, and a source of positive forward bias potential $E_3$ is connected to the emitter of transistor 11. The relationship of these voltages for proper pulse generation should be such that $-E_2$ is greater than $-E_1$ and $+E_4$ is greater than $+E_3$ thereby to maintain transistors 10 and 11** cut off when no pulse is applied to their bases.

A resistor 18 is connected between the terminal point 12 and ground and the terminal 12 is also connected to the emitter of each of a plurality of transistor gates 20 for the ferroelectric storage matrix 40. The storage matrix comprises a plurality of individual ferroelectric storage condensers 41 each comprising a dielectric 42 of a ferroelectric material and a pair of electrodes 43, as is known in the art; the condensers 41 may be distinct units or may be defined by crossed electrodes on a single slab of ferroelectric material, as is known. The condensers 41 are electrically connected in a rectangular array by a plurality of row leads 31 and column leads 32, the row leads 31 being connected to the collectors of the transistor gates 20. The column leads 32 are similarly connected to the collectors of transistors 45.

In the specific embodiment of this invention, only a four by four ferroelectric storage matrix is depicted, but it is to be understood that the principles of the invention are equally applicable to any size storage matrix and that, therefore, an *n* by *k* matrix should be considered as disclosed in the drawing.

Each of transistors 20 has its base connected to a source $E_5$ through the output winding 21 of a magnetic core 22. The magnetic core 22 also has at least one other winding 23 thereon serving as a control or shift winding and a set winding 25. Windings 23 and 25 are connected to suitable magnetic core circuitry 24 which may comprise a shift register as of the type disclosed in application Serial No. 523,956, filed July 25, 1955, of R. M. Wolfe, now Patent 2,910,670 issued October 27, 1959, in which case each of cores 22 is one core of the shift register, or may comprise a magnetic core matrix, in which case each of cores 22 is one core of the selection matrix. The prior case may advantageously be employed for cyclical sensing and storage of the ferroelectric memory while the latter case may advantageously be employed for random access to the ferroelectric memory. In either case, it is to be understood that additional windings may be provided on the magnetic cores as desired for the core circuitry 24.

Load impedances 30 are connected between each of the row leads 31 and ground.

Assume for the purposes of explanation that a binary digit or bit of information is to be stored in ferroelectric condenser **41*a*. A positive pulse from source 13 is applied to the base of transistor 10 through coupling condenser 15*a* at the same time that a negative pulse is applied to the base of transistor 45*a* through condenser 46*a* from a source 47. The pulse applied to the base of transistor 10 overcomes the bias $E_2$ and permits a pulse $e_1$ to flow from source $E_1$ through the emitter and base to the collector and then to terminal 12. This pulse is negative and of magnitude $e/2$ where $e$ is the magnitude required to reverse the remanent polarization of the ferroelectric material. Pulse $e_1$ is applied from terminal 12 to the emitters of each of transistors 20*a* through 20*n*. Substantially simultaneously with the application of this pulse $e_1$ to the emitters, a pulse is applied from the magnetic core circuitry 24 to the winding 23*a* causing a reversal of the state of magnetization of core 22*a* so that a pulse appears at the output winding 21*a* overcoming the bias $-E_5$ connected to the base of transistor 20*a* thereby rendering transistor 20*a* conductive to the pulse $e_1$. Pulse $e_1$ is therefore applied through the transistor 20*a* to row lead 31*a*** of the ferroelectric matrix.

Simultaneously with the application of pulse $e_1$ to row **31*a*, a positive pulse $e_2$ of value $e/2$ is applied from source 48*a* through transistor 45*a* to column 32*a*. The operation of the transistor gate 45*a* on application of a pulse from the pulse source 47 may be similar to that described above with reference to transistor 10**. While each of pulses $e_1$ and $e_2$ is individually insufficient to reverse the remanent polarization of the ferroelectric condenser, the combination of $e_1$ and $e_2$ is sufficient to overcome the opposing polarization and thus switch the domains in the ferroelectric material thereby storing a bit or digit of information.

In order to read out the information thus stored, a pulse is applied to the base of transistor 11 from source 14 through condenser **15*b* of a value sufficient to overcome the bias $+E_4$. This permits a pulse $e_3$ to flow from source $E_3$ through the transistor 11 to terminal 12. Simultaneously with the application of the pulse from source 14, a pulse is applied from the magnetic core circuitry 24 to winding 23*a* of core 22*a*, as described above, to maintain transistor 20*a* conductive to a pulse from either of multivibrators 10 and 11. Pulse $e_3$ is opposite in polarity to the previously applied store pulse and of sufficient magnitude alone to reverse the remanent polarization of the ferroelectric condenser 41*a*. In response to the resultant reversal of remanent polarization, a pulse is developed across output load 33*a* and delivered to output terminal 35*a*** indicating a stored digit or bit of information.

In the usual cycle of operation of ferroelectric matrices, information is first sensed in a particular ferroelectric storage condenser and then either that same or new information stored therein. Accordingly, the cycle of operation is that first the pulse $e_3$ from transistor 11 is applied through a transistor gate 20 to a row 31 and then immediately the pulse $e_1$ is applied from the transistor 10 through the same transistor gate 20 to the same row 31 simultaneously with the application of a pulse $e_2$ from a transistor 45 to a column lead 32. Accordingly, while in the above description of the operation of this embodiment the gating action of the transistor gates 20 has been described separately for both sensing and storing, it is to be understood that advantageously a single pulse is applied to an activating winding 23 of a magnetic core 22 to provide an output pulse on output winding 21 sufficient to overcome the inhibiting potential source $E_5$ during the time that both pulses $e_3$ and $e_1$ are generated by transistors 11 and 10, respectively, and applied to the transistor gates 20. In effect the switching time of the magnetic cores 22 is chosen to be sufficiently long so that the output pulse on winding 21 is present during this entire interval. Actually, due to hole storage in transistors 20, the transistors 20 will remain conducting for a brief interval after removal of the enabling pulse at winding 21 so that the switching time may be slightly less than the duration of pulses $e_3$ and $e_1$. After a particular transistor gate 20 has been enabled and prior to its next enablement, its associated core may be reset, by a pulse applied to set winding 25, or the core may be reset by a pulse applied to the activating winding 23 of opposite polarity to that applied to enable the transistor gate 20.

It is to be understood that the above-described arrangements are illustrative of the application of the principles of the invention. Numerous another arrangements may be devised by those skilled in the art without departing from the spirit and scope of the invention.

What is claimed is:

1. In a ferroelectric storage circuit, a plurality of ferroelectric condensers arranged in a storage array having row and column leads, a pair of transistors each including an emitter, a base and a collector, one of said pair of transistors for generating positive pulses and the other for generating negative pulses, individual transistor gating means serially connected between each of said row leads and said first-mentioned transistors, means connected to said transistor gating means for selectively rendering said gating means conductive to apply serial positive and negative pulses to a selected row of said array, and output means connected to each of said column leads of said array.

2. A ferroelectric storage circuit in accordance with claim 1 wherein the emitters of each of said transistor gating means are connected to the collectors of said pair of transistors and the collectors of each of said transistor gating means are connected to a row of said array, and said means for selectively rendering said gating means conductive includes magnetic core circuit means for applying enabling pulses to the bases of said transistor gating means, said magnetic core circuit means having individual output windings connected to individual of said bases and activating windings associated respectively with said output windings.

3. In a ferroelectric storage circuit a plurality of ferroelectric condensers arranged in a storage array having rows and columns, transistor pulse means for providing pulses of positive and negative polarity to store and sense information in said ferroelectric condensers, said transistor pulse means including a first transistor for generating said positive pulses and a second transistor for generating said negative pulses, individual transistor gating means serially connected between said transistor pulse means and each of said rows, and means for applying enabling pulses to selected ones of said transistor gating means.

4. A ferroelectric storage circuit in accordance with claim 3 wherein said transistor pulse means further includes circuitry for applying cut-off bias to said first and second transistors and means for applying triggering pulses to said transistors to overcome said bias.

5. In a ferroelectric storage circuit, positive and negative pulse generation circuitry including a first and a second transistor each having an emitter, a base and a collector, transistor gating means including emitters, bases and collectors, a plurality of ferroelectric capacitors each connected to one of the collectors of said transistor gating means, a first and a second source of forward bias potential applied respectively to the emitters of said first and said second transistors, a third and a fourth source of bias potential applied respectively to the bases of said first and second transistors, a source of bias potential connected to the bases of said transistor gating means, said biases being of the relationship such that the third bias source is greater than said first, and said fourth bias source is greater than said second, and means for overcoming said source of bias potential connected to the bases of said transistor gating means to enable said gating means.

6. In a ferroelectric storage circuit, a plurality of ferroelectric condensers arranged in a storage array having row and column leads, a pair of transistors each including an emitter, a base and a collector, for generating positive and negative pulses, one of said pair of transistors being of the p–n–p type and the other of the n–p–n type, transistor gating means connected between each of said row leads and said first-mentioned transistors, means connected to said transistor gating means for selectively rendering said gating means conductive to apply serial positive and negative pulses to a selected row of said array, and output means connected to each of said column leads of said array.

7. In a ferroelectric storage circuit, a plurality of ferroelectric condensers arranged in a storage array having rows and columns, transistor pulse means for providing pulses of positive and negative polarity to store and sense information in said ferroelectric condensers, transistor gating means connected between said transistor pulse means and each of said rows, and means for applying enabling pulses to selected ones of said transistor gating means, said gating means including a transistor having a base, an emitter and a collector, and said means for applying enabling pulses to said gating means including a magnetic core having an output winding connected to said base, an activating winding, and means for applying activating pulses to said activating winding to switch the magnetic state of said core.

8. A ferroelectric storage circuit comprising a plurality of ferroelectric condensers arranged in an array having row and column leads, a first and a second transistor circuit for generating pulses of opposite polarity, transistor gating means connected between said first and second transistor circuits and each of said row leads, means for selectively enabling said transistor gating means, said enabling means including a magnetic core having at least an output winding and a set winding, said output winding being connected to the base of said transistor gating means, and means selectively applying activating pulses to said set winding, and third transistor circuits connected to each of said column leads.

References Cited in the file of this patent

UNITED STATES PATENTS

| | | |
|---|---|---|
| 2,620,448 | Wallace | Dec. 2, 1952 |
| 2,644,896 | Lo | July 7, 1953 |
| 2,655,608 | Valdes | Oct. 13, 1953 |
| 2,691,073 | Lowman | Oct. 5, 1954 |
| 2,691,154 | Rajchman | Oct. 5, 1954 |
| 2,695,398 | Anderson | Nov. 23, 1954 |
| 2,717,373 | Anderson | Sept. 6, 1955 |
| 2,825,889 | Henle | Mar. 4, 1958 |